United States Patent [19]
Wegner et al.

[11] Patent Number: 5,589,228
[45] Date of Patent: Dec. 31, 1996

[54] PROCESS FOR COATING VEHICLE BODIES AND AQUEOUS COATING

[75] Inventors: Egon Wegner, Drensteinfurt; Ulrich Poth, Münster; Lutz-Werner Gross, Haltern; Klaus Weidemeier, Münster, all of Germany

[73] Assignee: BASF Lacke + Farben, AG, Muenster-Hiltrup, Germany

[21] Appl. No.: 321,082

[22] Filed: Oct. 11, 1994

Related U.S. Application Data

[63] Continuation of Ser. No. 934,624, filed as PCT/EP91/00110, Jan. 21, 1991, abandoned.

[30] Foreign Application Priority Data

Feb. 26, 1990 [DE] Germany .......................... 40 05 961.8

[51] Int. Cl.⁶ ................................ B05D 3/02; B05D 1/36

[52] U.S. Cl. .................. 427/407.1; 427/409; 427/411; 427/412.3; 427/412.4; 427/412.5; 427/418; 524/460; 524/522; 524/556; 524/560; 524/561

[58] Field of Search ................................ 427/407.1, 409, 427/411, 412.3, 412.4, 412.5, 418; 524/460, 522, 556, 560, 561

[56] References Cited

FOREIGN PATENT DOCUMENTS 0299148  1/1989  European Pat. Off. .

*Primary Examiner*—Ponnathapura Achutamurthy
*Attorney, Agent, or Firm*—Anne Gerry Sabourin

[57] ABSTRACT

The invention relates to a process for coating vehicle bodies in which an aqueous coating containing as the binder a combination of a water-dilutable polyurethane resin, a water-dilutable polyester resin and an aminoplast resin is employed as the stone-chip intermediate primer and/or filler.

14 Claims, No Drawings

PROCESS FOR COATING VEHICLE BODIES AND AQUEOUS COATING

This is a Continuation of application Ser. No. 07/934,624 filed Oct. 21, 1992, now abandoned.

The invention relates to a process for coating vehicle bodies, in particular automobile bodies, in which (1) an electro-dipping primer is applied and baked (2) if appropriate a stone-chip intermediate primer is applied and is baked separately or together with the filler coat applied in stage (3)

(3) a filler is applied and baked and (4) a single- or multi-layer top coating is applied and baked.

The invention also relates to an aqueous coating.

The coating process described above is well known to the expert. The filler coat has the particular task of filling and covering uneven areas in order to level the substrate for the subsequent top coat. The better this filling and covering of uneven areas on the substrate, the better the optical quality of the overall coating. In addition to the optical quality, important mechanical-technological properties of the overall coating, such as, for example, corrosion protection and above all resistance to stone chips and other mechanical attacks, also depend quite decidedly on the quality of the filler coat and—if present—the stone-chip intermediate primer coat.

Stoving enamels based on organic solvents have hitherto been employed quite predominantly for the production of the filler and stone-chip intermediate primer coats.

For economic and ecological reasons, the coating industry is making efforts to replace coatings based on organic solvents by aqueous coatings.

The invention is based on the object of providing aqueous coatings which are suitable for use in the process described above for the production of filler or stone-chip intermediate primer coats.

This object is achieved according to the invention by providing aqueous coatings which contain as the binder a combination of (A) 40 to 70% by weight of a water-dilutable polyurethane resin, (B) 15 to 40% by weight of a water-dilutable polyester resin and (C) 8 to 35% by weight of an aminoplast resin, in which the percentage by weight data are based on (A)+(B)+(C)=100% by weight, and component (A) has an acid number from 10 to 60 and a number-average molecular weight of 4000 to 25,000 and can be prepared by reacting (a) a polyester- and/or polyether-polyol having a number-average molecular weight of 400 to 5000, or a mixture of such polyester- and/or polyether-polyols, (b) a polyisocyanate, or a mixture of polyisocyanates, (c) a compound which contains in the molecule at least one group which is reactive towards isocyanate groups and at least one group which is capable of anion formation, or a mixture of such compounds, and if appropriate (d) an organic compound which contains hydroxyl and/or amino groups and has a molecular weight of 40 to 400, or a mixture of such compounds, with one another and at least partly neutralizing the reaction product formed, and component (B) is a water-dilutable polyester resin which has an acid number of 20 to 100, preferably 25 to 45, and a hydroxyl number of 40 to 150, preferably 50 to 80, and can be prepared by reacting (i) an organic compound containing at least three functional groups, in which at least one of the functional groups must be a carboxyl group and the other functional groups can be hydroxyl and/or amino and/or carboxyl and/or acid anhydride groups, an acid anhydride group being counted as two functional groups, or mixtures of such organic compounds, (ii) a cyclic dicarboxylic acid, or a mixture of cyclic dicarboxylic acids, (iii) if appropriate an aliphatic dicarboxylic acid, or a mixture of aliphatic dicarboxylic acids, (iv) a polyol in which at least one α-C atom is a secondary or tertiary C atom or a member in a carbon-containing ring system, or a mixture of such polyols, and (v) if appropriate a polyol other than (iv), or a mixture of such polyols, with one another, the carboxylic acid components ((i)+(ii)+(iii)) and the polyol components ((iv)+(v)) being employed in a molar ratio of 4:3 to 8:7, the molar ratio between ((i)+(ii)) and (iii) being 50:50 to 100:0, preferably 75:25, and the molar ratio between (iv) and (v) being 40:60 to 100:0, preferably 60:40 to 100:0, and at least partly neutralizing the reaction product formed.

The filler or stone-chip intermediate primer coats produced using the coatings according to the invention are distinguished by a very good stone-chip resistance (in particular at low temperatures), high elasticity, good adhesion after exposure to humidity and good sandability. Surprisingly, the coatings according to the invention are furthermore particularly suitable for the production of primer coats on aluminum.

Component (A) can be prepared from (a), (b), (c) and if appropriate (d) by the methods of polyurethane chemistry which are well known to the expert (compare, for example, U.S. Pat. No. 4,719,132, German Offenlegungsschrift 3,628,124, EP-A-89,497, EP-A-256,540 and WO 87/03829). Saturated and unsaturated polyester and/or polyether-polyols, in particular polyester- and/or polyether-diols having a number-average molecular weight of 400 to 5000, can be employed as component (a). Suitable polyether-diols are, for example, polyether-diols of the general formula H(—O—(CHR$^1$)$_n$—)$_m$OH, in which R$^1$ is hydrogen or a lower, optionally substituted alkyl radical, n is 2 to 6, preferably 3 to 4, and m is 2 to 100, preferably 5 to 50. Examples are linear or branched polyether-diols, such as poly(oxyethylene) glycols, poly(oxypropylene) glycols and poly(oxybutylene) glycols. The polyether-diols selected should not introduce excessive amounts of ether groups, because otherwise the polymers formed swell in water. The preferred polyether-diols are poly(oxypropylene) glycols in the molecular weight range $M_n$ from 400 to 3000. Polyester-diols are prepared by esterification of organic dicarboxylic acids or their anhydrides with organic diols, or are derived from a hydroxycarboxylic acid or a lactone. Polyols or polycarboxylic acid [sic] of higher functionality can be employed to a small degree to prepare branched polyester-polyols. The dicarboxylic acids and diols can be linear or branched aliphatic, cycloaliphatic or aromatic dicarboxylic acids or diols.

The diols used to prepare the polyesters consist, for example, of alkylene glycols, such as ethylene glycol, propylene glycol and butylene glycol, butane-1,4-diol, hexane-1,6-diol, neopentyl glycol and other diols, such as dimethylolcyclohexane. However, small amounts of polyols, such as trimethylolpropane, glycerol or pentaerythritol, can also be added. The acid component of the polyester primarily consists of low molecular weight dicarboxylic acids or their anhydrides having 2 to 30, preferably 4 to 18, carbon atoms in the molecule. Examples of suitable acids are o-phthalic acid, isophthalic acid, terephthalic acid, tetrahydrophthalic acid, cyclohexanedicarboxylic acid, succinic acid, adipic acid, azelaic acid, sebacic acid, maleic acid, fumaric acid, glutaric acid, hexachloroheptanedicarboxylic acid, tetrachlorophthalic acid and/or dimerized fatty acids. Instead of these acids, it is also possible to use their anhydrides, if these exist. Relatively small amounts of carboxylic acids having 3 or more carboxyl groups, for example trimellitic anhydride or the adduct of maleic anhydride on unsaturated fatty acids, can also be present during the formation of polyester-polyols.

It is also possible to employ polyester-diols which are obtained by reaction of a lactone with a diol. These are distinguished by the presence of terminal hydroxyl groups and recurring polyester portions of the formula (—CO—(CHR$^2$)$_n$—CH$^2$—O). In this formula, n is preferably 4 to 6 and the substituent R$^2$ is hydrogen or an alkyl, cycloalkyl or alkoxy radical.

No substituent contains more than 12 carbon atoms. The total number of carbon atoms in the substituent, does not exceed 12 per lactone ring. Examples thereof are hydroxycaproic acid, hydroxybutyric acid, hydroxydecanoic acid and/or hydroxystearic acid.

Unsubstituted ε-caprolactone, in which n has the value of 4 and all the R substituents are hydrogen, is preferred for the preparation of the polyester-diols. The reaction with the lactone is started by low molecular weight polyols, such as ethylene glycol, 1,3-propanediol, 1,4-butanediol or dimethylolcyclohexane. However, it is also possible for other reaction components, such as etyhlenediamine [sic], alkyldialkanolamines or also urea, to be reacted with caprolactone.

Polylactam-diols which are prepared by reaction of, for example, ε-caprolactam with low molecular weight diols are also suitable higher molecular weight diols.

Aliphatic and/or cycloaliphatic and/or aromatic polyisocyanates can be employed as component (b). Examples of aromatic polyisocyanates are phenylene diisocyanate, toluylene diisocyanate, xylylene diisocyanate, biphenylene diisocyanate, naphthylene diisocyanate and diphenylmethane diisocyanate.

Because of their good resistance to ultraviolet light, (cyclo)aliphatic polyisocyanates give products having a low yellowing tendency. Examples thereof are isophorone diisocyanate, cyclopentylene diisocyanate and hydrogenation products of the aromatic diisocyanates, such as cyclohexylene diisocyanate, methylcyclohexylene diisocyanate and dicyclohexylmethane diisocyanate. Aliphatic diisocyanates are compounds of the formula

OCN—(CR$^3$$_2$)$_r$—NCO in which r is an integer from 2 to 20, in particular 6 to 8, and R$^3$, which can be identical or different, represents hydrogen or a lower alkyl radical having 1 to 8 C atoms, preferably 1 or 2 C atoms. Examples thereof are trimethylene diisocyanate, tetramethylene diisocyanate, pentamethylene diisocyanate, hexamethylene diisocyanate, propylene diisocyanate, ethylethylene diisocyanate, dimethylethylene diisocyanate, methyltrimethylene diisocyanate and trimethylhexane diisocyanate. Particularly preferred diisocyanates are isophorone diisocyanate and dicyclohexylmethane diisocyanate.

Component (b) must be of a composition with respect to the functionality of the polyisocyanates such that no crosslinked polyurethane resin is obtained. In addition to diisocyanates, component (b) can also have a content of polyisocyanates having functionalities of more than two—such as, for example, triisocyanates.

Products which are formed by trimerization or oligomerization of diisocyanates or by reaction of diisocyanates with polyfunctional compounds containing OH or NH groups have proved to be suitable triisocyanates. These include, for example, the biuret of hexamethylene diisocyanate and water, the isocyanurate of hexamethylene diisocyanate or the adduct of isophorone diisocyanate on trimethylolpropane. If appropriate, the average functionality can be decreased by addition of monoisocyanates. Examples of such chain-stopping monoisocyanates are phenyl isocyanate, cyclohexyl isocyanate and stearyl isocyanate.

To guarantee the water-dilutability of the polyurethane resins employed, groups capable of anion formation must be incorporated into the polyurethane molecules. The groups capable of anion formation ensure, after their neutralization, that the polyurethane resin can be dispersed stably in water. The polyurethane resin (A) should have an acid number of 10 to 60, preferably 20 to 35. The amount of groups capable of anion formation which is to be introduced into the polyurethane molecules can be calculated from the acid number.

The groups capable of anion formation are introduced into the polyurethane molecules via incorporation of compounds (c) containing in the molecule at least one group which is reactive towards isocyanate groups and a group capable of anion formation into the polyurethane molecules.

Compounds containing in the molecule two groups which are reactive towards isocyanate groups are preferably employed as component (c). Suitable groups which are reactive towards isocyanate groups are, in particular, hydroxyl groups, as well as primary and/or secondary amino groups. Suitable groups which are capable of anion formation are carboxyl, sulfonic acid and/or phosphonic acid groups, carboxyl groups being preferred. Alkanoic acids having two substituents on carbon atoms in the α-position, for example, can be employed as component (c). The substituent can be a hydroxyl group, an alkyl group or, preferably, an alkylol group. These alkanoic acids have at least one, in general 1 to 3, carboxyl groups in the molecule. They have two to about 25, preferably 3 to 10, carbon atoms. Examples of component (c) are dihydroxypropionic acid, dihydroxysuccinic acid and dihydroxybenzoic acid. A particularly preferred group of alkanoic acids are the α,α-dimethylolalkanoic acids of the general formula R$^4$—C(CH$_2$OH)$_2$COOH, in which R$^4$ represents a hydrogen atom or an alkyl group having up to about 20 carbon atoms.

Examples of such compounds are 2,2-dimethylolacetic acid, 2,2-dimethylolpropionic acid, 2,2-dimethylolbutyric acid and 2,2-dimethylolpentanoic acid. The preferred dihydroxyalkanoic acid is 2,2-dimethylolpropionic acid. Examples of compounds containing amino groups are α,δ-diaminovaleric acid, 3,4-diaminobenzoic acid, 2,4-diaminotoluenesulfonic acid and 2,4-diaminodiphenyl ether-sulfonic acid.

The polyurethane resins (A) employed according to the invention can be prepared, if appropriate, by also using organic compounds which contain hydroxyl and/or amino groups and have a molecular weight of 40 to 400, or a mixture of such compounds (component (d). The use of component (d) leads to an increase in the molecular weight of the polyurethane resins. Examples of component (d) which can be employed are polyols having up to 20 carbon atoms per molecule, such as ethylene glycol, diethylene glycol, triethylene glycol, 1,2-propanediol, 1,3-propanediol, 1,4-butanediol, 1,2-butylene glycol, 1,6-hexanediol, trimethylolpropane, castor oil or hydrogenated castor oil, di-trimethylolpropane ether, pentaerythritol, 1,2-cyclohexanediol, 1,4-cyclohexanedimethanol, bisphenol A, bisphenol F, neopentyl glycol, neopentyl glycol hydroxypivalate, hydroxyethylated or hydroxypropylated bisphenol A, hydrogenated bisphenol A and mixtures thereof.

The polyols are in general employed in amounts of up to 30 percent by weight, preferably 2 to 20 percent by weight, based on the amount of components (a) and (d) employed. Di- and/or polyamines containing primary and/or secondary amino groups can also be employed as component (d). Polyamines are essentially alkylene-polyamines having 1 to 40 carbon atoms, preferably about 2 to 15 carbon atoms. They can carry substituents which have no hydrogen atoms which can react with isocyanate groups. Examples are polyamines containing linear or branched aliphatic, cycloaliphatic or aromatic structures and at least two primary amino groups. Diamines which may be mentioned are hydrazine, ethylenediamine, propylenediamine, 1,4-butylenediamine, piperazine, 1,4-cyclohexyldimethylamine, hexamethylene-1,6-diamine, trimethylhexamethylenediamine, menthanediamine, isophoronediamine, 4,4'-diaminodicyclohexylmethane and aminoethylethanolamine. Preferred diamines are hydrazine and alkyl- or cycloalkyldiamines, such as propylenediamine and 1-amino- 3-aminomethyl-2,5,5-trimethylcyclohexane. Polyamines which can contain more than two amino groups in the molecule can also be employed as component (d). However, in these cases it should be ensured, for example by also using monoamines, that no crosslinked polyurethane resins are obtained. Such polyamines which can be used are diethylenetriamine, triethylenetetramine, dipropylenetriamine and dibutylenetriamine. Ethylhexylamine is mentioned as an example of a monoamine.

The preparation of component (A) belongs to the prior art and is described in detail, for example, in U.S. Pat. No. 4,719,132, German Offenlegungsschrift 3,628,124, EP-A-89,497, EP-A-256,540 and WO 87/03829.

Component (B) is a water-dilutable polyester resin having an acid number of 20 to 100, preferably 25 to 45, and a hydroxyl number of 40 to 150, preferably 50 to 80, and can be prepared by reacting (i) an organic compound containing at least three functional groups, in which at least one of the functional groups must be a carboxyl group and the other functional groups can be hydroxyl and/or amino and/or carboxyl and/or acid anhydride groups, an acid anhydride group being counted as two functional groups, or mixtures of such organic compounds, (ii) a cyclic dicarboxylic acid, or a mixture of cyclic dicarboxylic acids, (iii) if appropriate an aliphatic dicarboxylic acid, or a mixture of aliphatic dicarboxylic acids, (iv) a polyol in which at least one $\alpha$-C atom is a secondary or tertiary C atom or a member in a carbon-containing ring system, or a mixture of such polyols, and (v) if appropriate a polyol other than (iv), or a mixture of such polyols, with one another, the carboxylic acid components ((i)+(ii)+(iii)) and the polyol components ((iv)+(v)) being employed in a molar ratio of 4:3 to 8:7, the molar ratio between (i)+(ii)+(iii) being 50:50 to 100:0, preferably 75:25, and the molar ratio between (iv) and (v) being 40:60 to 100:0, preferably 60:40 to 100:0, and at least partly neutralizing the reaction product formed.

The reaction of components (i), (ii), (iii), (iv) and (v) is carried out by generally well-known methods of polyester chemistry. The reaction temperature should advantageously be 140° to 240°, preferably 180° to 220° C. In some cases it may be appropriate to catalyze the esterification reaction. Examples of catalysts which can be used are tetrabutyl titanate, zinc octoate, tin octoate, dibutyltin oxide, organic salts of dibutyltin oxide and the like.

The polyester resins employed according to the invention are prepared by employing the carboxylic acid component and the polyol component in a molar ratio of 4:3 to 8:7, components (i)+(ii) and (iii) in a molar ratio of 50:50 to 100:0, preferably 75:25, and components (iv) and (v) in a molar ratio of 40:60 to 100:0, preferably 60:40 to 100:0. The carboxylic acid component consists of components (i), (ii) and if appropriate (iii). The polyol component consists of component (iv) and if appropriate (v). (i)+(ii) represents the sum of the amount of component (i) employed and the amount of component (ii) employed. Analogous comments apply to (i)+(ii)+(iii) and (iv)+(v).

Component (i) should be employed only in amounts such that no gelled polyester resins are obtained. The amount of component (i) to be employed can easily be calculated from the acid number to be achieved, it being postulated that the free carboxyl groups originate from component (i). The fact that not all the free carboxyl groups have to originate from component (i) is to be ignored when calculating the amount of component (i) to be employed.

Examples of component (i) which can be employed are polycarboxylic acids, such as, for example, tetracarboxylic acids and tricarboxylic acids, hydroxycarboxylic acids, such as, for example, monohydroxydicarboxylic acids and dihydroxymonocarboxylic acids, amino acids and the anhydrides of these acids. Examples are: trimesic acid (benzene-1,3,5-tricarboxylic acid), trimellitic acid, pyromellitic acid, glyceric acid, malic acid, dimethylolpropionic acid, tartaric acid, citric acid and the anhydrides of these acids. Adducts of maleic anhydride on unsaturated fatty acids and unsaturated resin acids can also be employed as (i) component [sic]. Trimellitic acid, trimellitic anhydride, pyromellitic acid or pyromellitic anhydride is preferably employed as component (i). Mixtures of the abovementioned acids can of course also be employed as component (i). Any cycloaliphatic or aromatic dicarboxylic acid having 5 to 30, preferably 6 to 18, carbon atoms in the molecule or an anhydride of this dicarboxylic acid or a mixture of these dicarboxylic acids or anhydrides thereof can in principle be employed as component (ii). Examples of dicarboxylic acids which can be employed are isophthalic acid, terephthalic acid, orthophthalic acid, tetrahydrophthalic acid, hexahydrophthalic acid, 1,4 cyclohexanedicarboxylic acid, dicyclopentadienedicarboxylic acid and endomethylenetetrahydrophthalic acid as well as anhydrides thereof. Isophthalic acid, terephthalic acid, orthophthalic acid, tetrahydrophthalic acid, hexahydrophthalic acid, anhydrides thereof or mixtures of these dicarboxylic acids or anhydrides thereof are preferably employed as component (ii).

Any linear or branched aliphatic dicarboxylic acid having 2 to 40 carbon atoms in the molecule or an anhydride of these dicarboxylic acids or a mixture of these dicarboxylic acids or anhydrides thereof can in principle be employed as component (iii). Examples of aliphatic dicarboxylic acids which can be employed are oxalic acid, malonic acid, succinic acid, glutaric acid, adipic acid, pimelic acid, suberic acid, azelaic acid, sebacic acid, maleic acid, fumaric acid and dimerized fatty acids, as well as anhydrides thereof. Adipic acid, azelaic acid, sebacic acid, succinic acid, dimerized fatty acids, anhydrides thereof or mixtures of these dicarboxylic acids or anhydrides thereof are preferably employed as component (iii).

Any polyol which has 4 to 40, preferably 5 to 12, carbon atoms in the molecule and in which at least one α-C atom is a secondary or tertiary C atom or a member in a carbon-containing ring system can in principle be employed as component (iv). It is also possible to employ mixtures of such polyols. Examples of component (iv) which can be employed are compounds which contain at least one molecular fragment of the general formula —C($R^1R^2$)—$CH_2OH$, in which $R^1$ and $R^2$ represent aliphatic, cycloaliphatic or aromatic hydrocarbon radicals having 1 to 20, preferably 1 to 6, carbon atoms. Examples of such compounds are neopentyl glycol, trimethylolpropane, trimethylolethane, 2-methyl-2-propylpropane-1,3-diol, 2-ethyl-2-butylpropane-1,3-diol, 2-ethyl-2-phenylpropane-1,3-diol, 2,2,4 trimethylpentane-1,5-diol, 2,2,5 trimethylhexane-1,6-diol and neopentyl glycol hydroxypivalate. Dimethylolcyclohexane is mentioned as an example of a compound in which at least one α-C atom is a member in a carbon-containing ring system. Neopentyl glycol, neopentyl glycol hydroxypivalate, dimethylolcyclohexane and 2-ethyl-2-butylpropane-1,3-diol are preferably employed as component (iv).

All polyols other than (iv) which have 2 to 40 carbon atoms in the molecule, and mixtures of such polyols, can in principle be employed as component (v). Examples of suitable polyols are ethylene glycol, propylene glycol, butylene glycol, butane-1,4-diol, hexane-1,6-diol, diethylene glycol and dipropylene glycol.

Ammonia and/or amines (in particular alkylamines), aminoalcohols and cyclic amines, such as di- and triethylamine, dimethylaminoethanolamine, diisopropanolamine, morpholine and N-alkylmorpholine, can be employed for neutralizing components (A) and (B). Highly volatile amines are preferred for the neutralization.

Component (C) is an aminoplast resin. Such resins are wellknown to the expert and are available as commercial products from many companies. Aminoplast resins are condensation products of aldehydes, in particular formaldehyde, and, for example, urea, melamine, guanamine and benzoguanamine. The aminoplast resins contain alcohol groups, preferably methylol groups, which as a rule are partly or preferably completely etherified with alcohols. Water-dilutable aminoplast resins, in particular water-dilutable melamine-formaldehyde resins, are preferably employed as component (C).

In addition to the combination according to the invention of (A), (B) and (C), the coatings according to the invention can contain any desired auxiliaries and additives which are known per se in coating technology, such as organic solvents, pigments, fillers, flow auxiliaries and the like. The expert can formulate aqueous stoving enamels without problems with the aid of the combination according to the invention of (A), (B) and (C) with the aid of his expert knowledge, and these can be employed as a stone-chip intermediate primer and/or as a filler. However, it is also possible to prepare aqueous coatings which are suitable for other intended uses with the aid of the combination according to the invention of (A), (B) and (C).

The coatings according to the invention can be applied to any desired substrates, such as, for example, metals, plastics, wood or glass, by methods which are known per se, for example by spraying, brushing, dipping, flooding, knife-coating or rolling. The substrates to be coated can be provided with suitable primer coats.

The invention is illustrated in more detail in the following examples. All the data on parts and percentages are weight data, unless expressly stated otherwise.

1. Preparation of the Polyurethane Resins Employed According to the Invention 1.1 Polyurethane Dispersion I 796 g of a polyester which contains hydroxyl end groups (acid number 5 mg of KOH/g) and is based on neopentyl glycol (1.00 mol), hexane-1,6-diol (1.89 mol) and adipic acid (1.93 mol) are heated at 82° C. together with 113.9 g of dimethylolpropionic acid, 742.5 g of 4,4'-diisocyanatodicyclohexylmethane and 1,101.8 g of methyl ethyl ketone, while stirring. At an NCO content, based on the reaction mixture, of 1.44%, 76.0 g of trimethylolpropane are added. This reaction solution is kept at 82° C. until an NCO content of 0.0% is reached or the viscosity (plate/cone viscometer) of a sample (diluted 1:1 with N-methylpyrrolidone) is greater than 11 dPas. To eliminate any residual NCO groups present, the mixture is kept at 82° C. for one hour, after addition of 12 g of ethanol. 66.1 g of dimethylethanolamine are then added and the mixture is dispersed in 3,555 g of deionized water. After removal of the methyl ethyl ketone by vacuum distillation, 138.3 g of butyldiglycol are added and the mixture is filtered. The resulting finely divided dispersion has a non-volatile content of 30% and a pH of 7.5.

1.2 Polyurethane Dispersion II

The following components are employed analogously to the instructions for the preparation of polyurethane dispersion I: 1,250 g of a polyester (acid number 5 mg of KOH/g) based on adipic acid (1.00 mol), tetrahydrophthalic anhydride (1.00 mol), hexane-1,6-diol (1.08 mol) and neopentyl glycol (1.30 mol), 140.4 g of dimethylolpropionic acid, 55.5 g of neopentyl glycol, 547.0 g of toluylene 2,4-diisocyanate/toluylene 2,6-diisocyanate (80:20), 1,330 g of methyl ethyl ketone, 105.0 g of trimethylolpropane (at an NCO content of 1.33%, based on the reaction solution), 14.4 g of ethanol, 82.5 g of dimethylethanolamine, 4,895.1 g of deionized water and 167.8 g of butyldiglycol. After removal of the methyl ethyl ketone, the resulting polyurethane dispersion has a non-volatile content of 30% and a pH of 7.6.

1.3 Polyurethane Dispersion III

The following components are employed analogously to the instructions for the preparation of polyurethane dispersion I: 541.4 g of a polyester (acid number 3.5 mg of KOH/g) based on a polymeric industrial fatty acid (dimer content at least 98% by weight, trimer content not more than 2% by weight) (1.00 mol), isophthalic acid (1.01 mol) and hexane-1,6-diol (2.64 mol), 44.2 g of dimethylolpropionic acid, 7.2 g of neopentyl glycol, 202.8 g of isophorone diisocyanate, 399.4 g of methyl ethyl ketone, 24.9 g of trimethylolpropane (at an NCO content of 1.10%, based on the reaction solution), 5.7 g of ethanol, 24.6 g of dimethylethanolamine, 1,914.5 g of deionized water and 65.6 g of butyldiglycol. A polyurethane dispersion having a non-volatile content of 30% and a pH of 8.0 results.

1.4 Polyurethane Dispersion IV

The following components are employed analogously to the instructions for the preparation of polyurethane dispersion I: 1,210.9 g of polyester (see the example for polyurethane dispersion I), 195.3 g of dimethylolpropionic acid, 1,145.4 g of 4,4'-diisocyanatodicyclohexylmethane and 1,700 g of methyl ethyl ketone. Instead of trimethylolpropane, 403 g of methyl ethyl ketone and 1,705.4 g of a polyester (acid number 30.5 mg of KOH/g) based on neopentyl glycol (1.25 mol), hexane-1,6-diol (1.00 mol), trimethylolpropane (2.25 mol), tetrahydrophthalic acid (2.50 mol) and adipic acid (1.75 mol) are added at an NCO content of 1.44%, based on the reaction mixture. As soon as no further free NCO groups are detectable, the mixture is neutralized with 170.0 g of dimethylethanolamine and dispersed in 9,933.0 g of deionized water, the methyl ethyl ketone is distilled off in vacuo and 340.6 g of butyldiglycol are added.

The finely divided dispersion has a non-volatile content of 30% and a pH of 8.0.

2. Preparation of the Polyester Resins Employed According to the Invention 2.1 Polyester Resin I 290.6 g of dipropylene glycol, 236.0 g of 2,2-dimethylpropane-1,3-diol and 415.4 g of isophthalic acid are weighed into a 2 1 reaction container which has indirect heating via a circulating oil thermostat and is equipped with an anchor stirrer and a stirrer motor having a multi-step reduction gear, a packed column, a condenser and a distillate receiver and temperature measurement in the reactor and at the column head, and the mixture is heated rapidly up to 170° C. The temperature is then increased to 220° C. in the course of 7 hours such that the column head temperature does not exceed 103° C. Esterification is then carried out at 220° C. until an acid number of 10.3 and a viscosity (measured in an ICI plate/cone viscometer at 23° C. on a 60% strength solution of the polyester in 2-butoxyethanol) of 125 mPa.s are reached. The mixture is then cooled to 150° C., 160.1 g of trimellitic anhydride are added and the mixture is again heated up carefully to 180° C. Esterification is carried out up to an acid number of 54.3 and a viscosity (measured in an ICI plate/cone viscometer at 23° C. on a 50% strength solution of the polyester in 2-butoxyethanol) of 185 mPa.s. The mixture is then cooled rigorously, incipiently dissolved with 111.1 g of 2-butoxyethanol at below 140° C. and partly neutralized with 68.9 g of 2-(N,N-dimethylamino)ethanol, and cooled further to 90° C. The solution is then drained into a stirred vessel and diluted to a content of non-volatile substance (measured on a sample of about 1 g after an evaporation of 60 minutes at 130° C. in a circulating air drying cabinet) of 40.0% with four portions of deionized water. A colloidal solution containing 0.65 mequivalent of base per 100 g of substance results.

2.2 Polyester Resin II 498.0 g of 2,2-dimethylpropane-1,3-diol, 203.0 g of tetrahydrophthalic anhydride and 181.0 g of isophthalic acid are weighed into the apparatus described above. The procedure is as for the preparation of polyester resin I and the esterification is carried out up to an acid number of 17.7 and a viscosity (measured in an ICI plate/cone viscometer at 23° C. on a 60% strength solution of the polyester in 2-butoxyethanol) of 115 mPa.s. The mixture is cooled as for the preparation of polyester resin I, 228.0 g of trimellitic anhydride are added, the mixture is heated up again and esterification is carried out up to an acid number of 57.3 and a viscosity (measured in an ICI plate/cone viscometer at 23° C. on a 60% strength solution of the polyester in 2-butoxyethanol) of 1,760 mPa.s. The product is partly dissolved with 120 g of 2-butoxyethanol and the mixture is neutralized, as in the preparation of polyester resin I, with 55.0 g of 2-(N,N-dimethylamino)-ethanol and brought to a pH of 7.20 and a content of non-volatile substance of 40.0% with deionized water and further 2-(N,N-dimethylamino)-ethanol.

2.3 Polyester Resin III

The procedure is as for the preparation of polyester resin I. The following are weighed out for the first reaction stage: 203.9 g of 2,2-dimethylpropane-1,3-diol and 400.0 g of an ester of 2,2-dimethylpropane-1,3-diol and 2,2-dimethyl-3-hydroxypropionic acid, and 325.5 g of isophthalic acid. The mixture is boiled until an acid number of 13.3 and a viscosity (measured in an ICI plate/cone viscometer at 23° on a 60% strength solution of the polyester in 2-butoxyethanol) of 110 mPa.s are reached. The addition of trimellitic anhydride is 161.4 g. Esterification is carried out in the second reaction stage up to an acid number of 32.6 and a viscosity (measured in an ICI plate/cone viscometer at 23° C. on a 50% strength solution of the polyester in 2-butoxyethanol) of 250 mPa.s. The mixture is cooled and the product is partly dissolved with 2-(2-butoxy-ethoxy)ethanol to a content of non-volatile substance of 85.0%, 80% of the carboxyl groups, calculated from the acid number, are subsequently neutralized with 2-(N,N-dimethylamino)-ethanol and the mixture is finally diluted, as described above, to a content of non-volatile substance of 40.0% with water.

3. Preparation of Coatings According to the Invention

In accordance with the parts by weight shown in Table 1, deionized water, a solution of a commercially available foam suppressant based on an unsaturated branched diol, dissolved in ethylene glycol, and N,N-dimethylethanolamine are added to the aqueous polyester dispersions described above and the mixture is made into a paste with after-treated titanium dioxide of the rutile type and commercially available, finely divided barium sulfate, surface-treated talc and a commercially available flame soot. These mixtures are introduced into a discontinuous laboratory sand mill and dispersed until a fineness of not more than 12 μm is achieved in a Hegmann grindometer. Coatings 1 to 7 according to the invention are then obtained from the dispersion mixtures by addition of the polyurethane dispersions described above, low molecular weight melamine resin highly etherified with methanol, a commercially available flow agent based on a water-dilutable acrylate resin, glycol ethers and further deionized water by generally known methods (compare Table 1).

TABLE 1

| Coating | 1 | 2 | 3 | 4 | 5 | 6 | 7 |
|---|---|---|---|---|---|---|---|
| Polyester I | 17.5 | 17.5 | 17.5 | 17.5 | — | — | 17.5 |
| Polyester II | — | — | — | — | 17.5 | — | — |
| Polyester III | — | — | — | — | — | 17.5 | — |
| Deionized water | 4.5 | 4.5 | 4.5 | 4.5 | 4.5 | 4.5 | 3.5 |
| N,N',Dimethylethanolamine | 0.1 | 0.1 | 0.1 | 0.1 | 0.1 | 0.1 | 0.1 |
| Titanium dioxide | 12.0 | 12.0 | 12.0 | 12.0 | 12.0 | 12.0 | 12.0 |
| Barium sulfate | 12.0 | 12.0 | 12.0 | 12.0 | 12.0 | 12.0 | 12.0 |
| Talc | 1.3 | 1.3 | 1.3 | 1.3 | 1.3 | 1.3 | 1.3 |
| Flame soot | 0.1 | 0.1 | 0.1 | 0.1 | 0.1 | 0.1 | 0.1 |
| Foam suppressant | 0.2 | 0.2 | 0.2 | 0.2 | 0.2 | 0.2 | 0.2 |
| Dispersion mixture | 47.7 | 47.7 | 47.7 | 47.7 | 47.7 | 47.7 | 46.7 |
| Polyurethane dispersion I | 46.7 | — | — | — | 46.7 | 46.7 | 46.7 |
| Polyurethane dispersion II | — | 46.7 | — | — | — | — | — |
| Polyurethane dispersion III | — | — | 46.7 | — | — | — | — |
| Polyurethane dispersion IV | — | — | — | 46.7 | — | — | — |
| Melamine resin (Cymel 301) ®[1)] | 3.0 | 3.0 | 3.0 | 3.0 | 3.0 | 3.0 | 3.8 |
| Butyldiglycol | 1.6 | 1.6 | 1.6 | 1.6 | 1.6 | 1.6 | — |
| Butylglycol | — | — | — | — | — | — | 1.8 |
| Flow agent | 0.6 | 0.6 | 0.6 | 0.6 | 0.6 | 0.6 | 0.6 |
| Deionized water | 0.4 | 0.4 | 0.4 | 0.4 | 0.4 | 0.4 | 0.4 |
|  | 100.0 | 100.1 | 100.0 | 100.0 | 100.0 | 100.0 | 100.0 |

[1)]Commercial product from the American Cyanamid Company

4. Application of the Coatings According to the Invention as a Filler

Coatings 1 to 6 were brought to a viscosity of 25 s, measured in a DIN 4 flow cup at 20° C., with deionized water and sprayed, using a flow cup gun (nozzle opening 1.2 mm; air pressure 4.5 bar) in two cross-way operations with an intermediate flash-off time of 1 minute, onto phosphated steel sheets coated with an electro-dipping primer in accordance with Example 6 of German Offenlegungsschrift 2,701,002. The application was carried out at an air temperature of 23° C. and a relative atmospheric humidity of 60%. The sprayed sheets were exposed to air at 23° C. for 10 minutes and then at 80° C. in a circulating air oven for 10 minutes, and were subsequently baked at 160° C. in a circulating air oven for 20 minutes, cooled and evaluated. The resulting coatings exhibited a very good leveling, covered the structure of the electro-dipping primer very well and exhibited a good intermediate adhesion to the electro-dipping primer coat. The coatings were also applied electrostatically. In this case, an Esta-Behr unit with a TOS 300/5/8 bell was used at a distance of 30 cm and a speed of rotation of 30,000 revolutions per minute at a relative atmospheric humidity of 40–70%.

After cooling, the sheets were then additionally oversprayed with a solvent-containing white storing top coat based on an alkyd resin containing saturated and unsaturated fatty acids (acid number 12, OH number 110) in combination with a medium molecular weight melamine resin partly etherified with n-butanol (ratio of 2:1), pigmented with an after-treated titanium dioxide of the rutile type (pigment volume concentration 21%) and containing solvents and additives which are usually employed for processing a coating for automobile line coating, and were baked at 130° C. for 30 minutes (dry film thickness 40 μm).

The coatings are distinguished by good leveling, good covering of the structure of the primer coat and good intermediate adhesion.

Further data and test results are to be found in Table 2.

TABLE 2

| Coating | 1 | 2 | 3 | 4 | 5 | 6 |
|---|---|---|---|---|---|---|
| Filler layer thickness (μm) | 35 | 35 | 35 | 35 | 35 | 35 |
| Cross-hatch according to DIN 53151 (Gt B) | 0–1 | 0–1 | 0–1 | 0 | 1 | 0–1 |
| VDA stone-chip* 1000 g/2 bar | 2 | 3 | 3 | 3 | 1 | 2 |
| Multiple-impact test using moraine chips** | 1 | 2 | 2 | 1 | 1 | 2 |
| Single-impact test according to DIN 55995 at −23° C. [mm²/rust degree] | 3/RO | 2/RO | 4/RO | 2/RO | 4/RO | 3/RO |

*The stone-chip test was carried out with a VDA stone-chip tester (model 508) (a single bombardment with 1000 g of steel scraps within 20 seconds; pressure 2 bar). The evaluation scale extends from 1 (very good) to 10 (very poor).
**The test was carried out with the Mercedes Benz multiple-impact apparatus. Bombardment with 300 g of moraine chips, grain size 5–8 mm, air pressure 0.5 bar, tube diameter 20 mm, bombardment distance 200 mm, bombardment duration 10 seconds. The evaluation scale extends from 0 (very good) to 5 (very poor).

Coating 7 was adjusted, applied and baked in the same way as coatings 1 to 6. An aluminum sheet (AL 99) was used as the substrate. The sheet was then over-coated with a commercially available white polyester powder coating pigmented with titanium dioxide, and baked at 180° C. for 20 minutes (layer thickness 100 μm). The sheet was subjected to alternate condensation water and temperature testing for 500 hours (84 cycles of 6 hours in a climatically controlled cabinet as follows: 1 hour heating from 23° to 40° C., 1 hour at 40° C., 4 hours cooling to 23° C. Relative atmospheric humidity always 100%). After this exposure, no blistering was to be observed and the cross-hatch test gave the characteristic value Gt 0 (DIN 53151 Gt B).

We claim:

1. A process for coating vehicle bodies, comprising the steps of
   (1) applying to a substrate an electro-dipping primer and baking the primer
   (2) optionally, applying an intermediate primer, resistant to damage by stone chips and baking separately or together with the filler coat applied in stage (3)
   (3) applying a filler and baking the filler and
   (4) applying a single- or multi-layer top coating and baking,
   in which the intermediate primer and/or filler-coat employed is an aqueous stoving enamel containing as the binder a combination of
   (A) a water-dilutable polyurethane resin,
   (B) a water-dilutable polyester resin and
   (C) an aminoplast resin,
      in which component (A) has an acid number from 10 to 60 and a number-average molecular weight of 4000 to 25,000 and is prepared by reacting
      (a) a polyester- and/or polyether-polyol having a number-average molecular weight of 400 to 5000, or a mixture of such polyester- and/or polyether-polyols,
      (b) a polyisocyanate, or a mixture of polyisocyanates,
      (c) a compound which contains in the molecule at least one group which is reactive towards isocyanate groups and at least one group which is capable of anion formation, or a mixture of each compounds, and optionally
      (d) an organic compound which contains hydroxyl and/or amino groups and has a molecular weight of 40 to 400, or a mixture of such compounds,
   with one another and at least partly neutralizing the reaction product formed, wherein component (A) is employed in an amount of 40 to 70% by weight, component (B) in an amount of 15 to 40% by weight and component (C) in an amount of 8 to 35% by weight, in which the percentage by weight data are based on (A)+(B)+(C)=100% by weight, and component (B) is a water-dilutable polyester resin which has an acid number of 20 to 100, preferably 25 to 45, and a hydroxyl number of 40 to 150, preferably 50 to 80, and can be prepared by reacting
      (i) an organic compound containing at least three functional groups, in which at least one of the functional groups is a carboxyl group and the other functional groups are selected from the group consisting of hydroxyl, amino, carboxyl, acid anhydride groups, and mixtures thereof, where an acid anhydride group is counted as two functional groups, and mixtures of such organic compounds,
      (ii) a cyclic dicarboxylic acid, or a mixture of cyclic dicarboxylic acids,
      (iii) optionally an aliphatic dicarboxylic acid, or a mixture of aliphatic dicarboxylic acids,
      (iv) a polyol in which at least one α-C atom is a secondary or tertiary C atom or a member in a carbon-containing ring system, or a mixture of such polyols, and
      (v) optionally a polyol other than (iv), or a mixture of such polyols,
   with one another, the carboxylic acid components ((i)+(ii)+(iii)) and the polyol components ((iv)+(v)) being employed in a molar ratio of 3:4 to 7:8, the molar ratio between (i)+(ii) and (iii) being 50:50 to 100:0, and the molar ratio between (iv) and (v) being 40:60 to 100:0, and at least partly neutralizing the reaction product formed.

2. A process as claimed in claim 1 wherein (A) is present in an amount of between 50% and 65% by weight, (B) is present in an amount between 20 to 35% by weight, and (C) is present in an amount between 10 to 25% by weight.

3. A process as claimed in claim 1 wherein component (A) has an acid number of 20 to 35 and a number average molecular weight of 8000 to 15,000.

4. A process as claimed in claim 1 wherein component (i) is selected from the group consisting of trimellitic acid, trimellitic anhydride, pyromellitic acid and pyromellitic anhydride, and mixtures thereof.

5. A process as claimed in claim 1 wherein component (ii) is selected from the group consisting of phthalic acid, isophthalic acid, terephthalic acid, tetrahydrophthalic acid, hexahydrophthalic acid, anhydrides of these acids, and mixtures thereof.

6. A process as claimed in claim 1 wherein component (iii) is selected from the group consisting of adipic acid, azelaic acid, sebacic acid, anhydrides of these acids, and mixtures thereof.

7. A process as claimed in claim 1 wherein component (iv) is selected from the group consisting of neopentyl glycol, 2-ethyl-2-butylpropane-1,3-diol, neopentyl glycol hydroxypivalate and mixtures thereof.

8. An aqueous coating, comprising as the binder a combination of
   (A) a water-dilutable polyurethane resin,
   (B) a water-dilutable polyester resin and
   (C) an aminoplast resin,
      in which component (A) has an acid number from 10 to 60 and a number-average molecular weight of 4000 to 25,000 and is prepared by reacting
      (a) a polyester- and/or polyether-polyol having a number-average molecular weight of 400 to 5000, or a mixture of such polyester- and/or polyether-polyols,
      (b) a polyisocyanate, or a mixture of polyisocyanates,
      (c) a compound which contains in the molecule at least one group which is reactive towards isocyanate groups and at least one group which is capable of anion formation, or a mixture of such compounds, and optionally
      (d) an organic compound which contains hydroxyl and/or amino groups and has a molecular weight of 40 to 400, or a mixture of such compounds,
   with one another and at least partly neutralizing the reaction product formed, wherein component (A) is employed in an amount of 40 to 70% by weight, component (B) in an amount of 15 to 40% by weight and component (C) in an amount of 8 to 35% by weight, in which the percentage by weight data are based on (A)+(B)+(C)=100% by weight, and component (B) is a water-dilutable polyester resin which has an acid number of 20 to 100, and a hydroxyl number of 40 to 150, and is prepared by reacting (i) an organic compound containing at least three functional groups, in which at least one of the functional groups must be a carboxyl group and the other functional groups are selected from the group consisting of hydroxyl, amino, carboxyl, acid anhydride groups, and mixtures thereof, where an acid anhydride group is counted as two functional groups, and mixtures of such organic compounds, (ii) a cyclic dicarboxylic acid, or a mixture of cyclic dicarboxylic acids, (iii) optionally an aliphatic dicarboxylic acid, or a mixture of aliphatic dicarboxylic acids, (iv) a polyol in which at least one α-C atom is a secondary or tertiary C atom or a member in a carbon-containing ring system, or a mixture of such polyols, and (v) optionally a polyol other than (iv), or a mixture of such polyols, with one another, the carboxylic acid components ((i)+(ii)+(iii)) and the polyol components ((iv)+(v)) being employed in a molar ratio of 3:4 to 7:8, the molar ratio between (i)+(ii) and (iii) being 50:50 to 100:0, preferably 75:25, and the molar ratio between (iv) and (v) being 40:60 to 100:0, preferably 60:40 to 100:0, and at least partly neutralizing the reaction product formed.

9. A process as claimed in claim 8 wherein (A) is present in an amount of between 50% and 65% by weight, (B) is present in an amount between 20 to 35% by weight, and (C) is present in an amount between 10 to 25% by weight.

10. A process as claimed in claim 8 wherein component (A) has an acid number of 20 to 35 and a number average molecular weight of 8000 to 15,000.

11. A process as claimed in claim 8 wherein component (i) is selected from the group consisting of trimellitic acid, trimellitic anhydride, pyromellitic acid and pyromellitic anhydride, and mixtures thereof.

12. A process as claimed in claim 8 wherein component (ii) is selected from the group consisting of phthalic acid, isophthalic acid, terephthalic acid, tetrahydrophthalic acid, hexahydrophthalic acid, anhydrides of these acids, and mixtures thereof.

13. A process as claimed in claim 8 wherein component (iii) is selected from the group consisting of adipic acid, azelaic acid, sebacic acid, anhydrides of these acids, and mixtures thereof.

14. A process as claimed in claim 8 wherein component (iv) is selected from the group consisting of neopentyl glycol, 2-ethyl-2-butylpropane-1,3-diol, neopentyl glycol hydroxy-pivalate and mixtures thereof.

* * * * *